United States Patent Office 3,667,773
Patented June 6, 1972

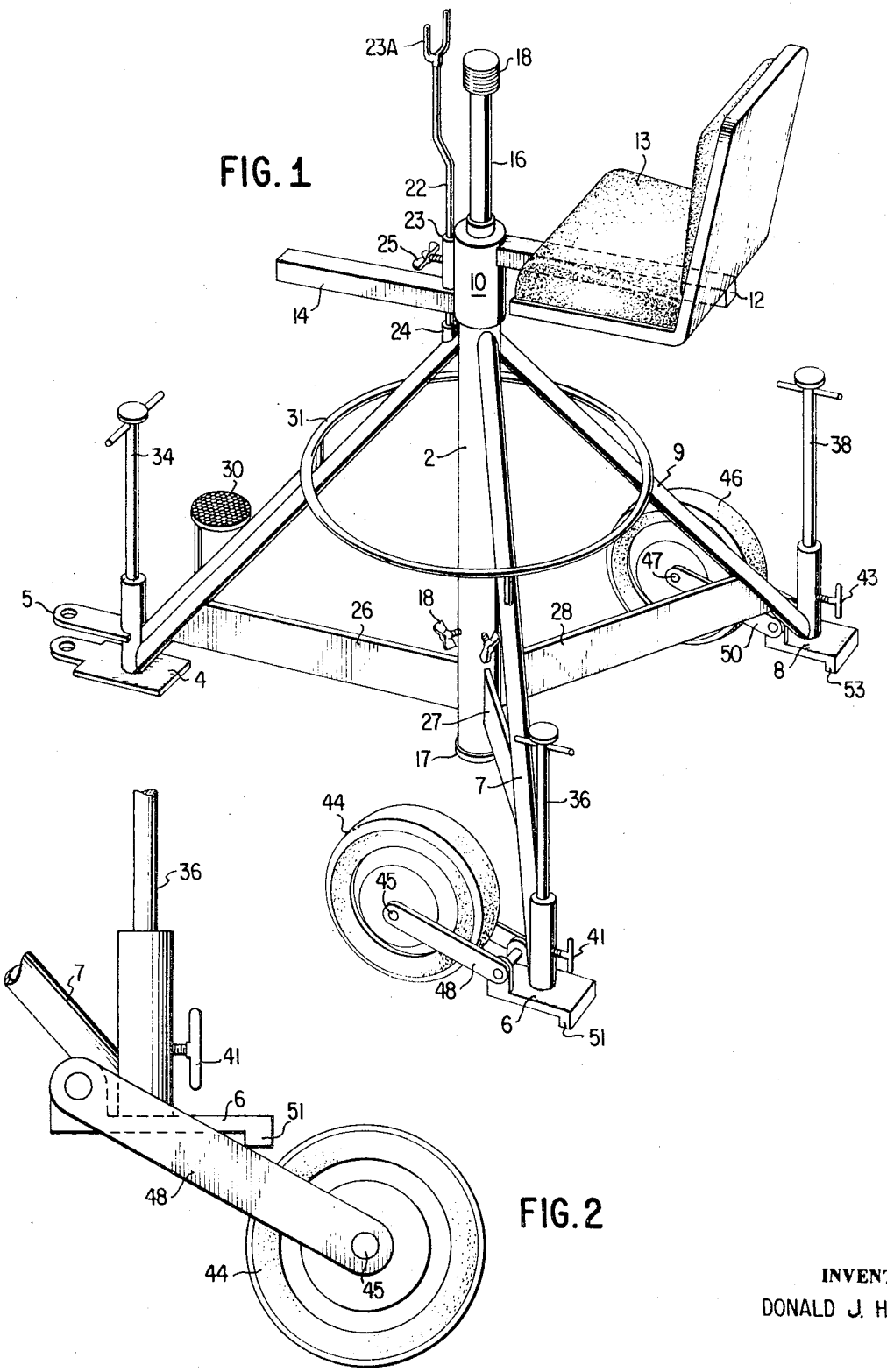

3,667,773
SURVEYOR FIELD TRIPOD
Donald J. Hess, Rte. 1, P.O. Box 268A,
Wynne, Ark. 72396
Filed Nov. 17, 1970, Ser. No. 90,255
Int. Cl. F16m 11/42
U.S. Cl. 280—30
9 Claims

ABSTRACT OF THE DISCLOSURE

A transportable tripod for holding surveying or other instruments, including a beam frame with three support elements which rest on the ground. A central, vertical beam is hollow to slideably receive an instrument support stem and an inclined beam extends from each support element to connect with the central, vertical beam near its top. A bearing sleeve rests on the top of the vertical beam to be rotatable relative to the remainder of the frame. A seat support and a counter-balancing bracket are affixed to opposite sides of the bearing sleeve and turnable therewith. Also, an instrument guide fork is connected to the sleeve to extend upwardly parallel to the stem above the seat support. During transport, the forward support element is used as a hitch for connection to a prime mover. The rearward two support elements are linked to wheels which are pivoted to a travel position. Each of the support elements are plates with anchor means to secure the tripod to the ground.

---

It is an object of the present invention to provide a heavy duty field tripod which is transportable and which can be quickly placed in both operative and transport condition. These and other objects will be apparent from the description and drawings in which:

FIG. 1 is side elevation of the tripod in operative (non-transport) condition; and FIG. 2 is an elevation of one of the rear wheels placed in transport position.

In FIG. 1, the tripod is shown with a hollow, substantially vertical beam 2 which comprises the central part of the frame. Ground support elements in the form of flat plates are secured to the frame with the forward plate 4 having a hitch 5 for coupling to a prime mover, such as a truck. The plates 6 and 8 form the rearmost support elements and each of the plates 4, 6 and 8, are connected to vertical beam 2 through inclined beams 3, 7 and 9 respectively. The lower ends of beams 3, 7 and 9 each terminate in collars which are welded or otherwise affixed to their respective plates. The upper ends of beams 3, 7 and 9 are joined by welding or otherwise to the upper portion of beam 2.

A bearing sleeve 10 rests and swivels on the top of beam 2 and an operator's seat support 12 with seat 13 are connected to the sleeve. A counter weight bracket 14 is secured to the sleeve 10 on the opposite side thereof so that the operator's weight can be balanced if necessary or desired. An instrument stem 16 is passed through sleeve 10 to slide within beam 2. At the bottom of beam 2, a cap 17 is provided to sustain the weight of the stem 16 and instrument mounted on stem 16, and a series of lock screws 18 are threaded in the base of beam 2 to lock the stem 16 fast relative to beam 2.

The top 18 of stem 16 is threaded to hold an instrument and an instrument guide 22 in the from of a bent rod is slideably fitted in a tube 23 welded or otherwise attached to sleeve 10. The guide 22 normally rests in pocket 24 on the forward part of beam 3, but can be vertically adjusted and locked with set screw 25 in selected positions. The upper end of guide 22 is a fork 23A designed to receive an optical tube or other part of a surveyor's instrument.

As viewed in the drawings, the tripod is a robust implement designed for field use in rugged terrain. The frame is reinforced by horizontal struts 26, 27 and 28 which interconnect the lower part of beam 2 with beams 3, 7 and 9 respectively. A mounting step 30 is affixed to the front beam 3 and a circular footrest 31 is connected to each of beams 3, 7 and 9 to further reinforce the frame.

Each of the plates 4, 6 and 8 have anchoring means specifically stakes 34, 36 and 38 and these stakes are passed through the collars of their respective beams. When driven into the ground, the frame can be secured and leveled using the screw locks 41, 43 and that on the forward beam (not shown). Each of the stakes have a handle for withdrawal.

The rearmost plates 6 and 8 are connected to wheels 44 and 46 at their axles 45 and 47 respectively, through hinge straps 48 and 50. As seen in operative position in FIG. 1, the wheels 44 and 46 have been pivoted and moved forwardly so that rear plates 6 and 8 rest on the ground. When moved to the rear, the hinge strap 48 and wheel 44 assume the position shown in FIG. 2 with the strap 48 resting against stop 51. Likewise, wheel 46 and strap 50 are folded back so that strap 50 bears on stop 53 of plate 8.

It will thus be seen that a sturdy transportable surveyor's tripod has been provided which can be quickly converted from a transport to an operative condition and fixed into place. After use, the front end of the tripod can be quickly lifted and hitched at 5 with the wheels 44 and 46 moved rearwardly to transport position.

What is claimed is:

1. A surveying tripod comprising a wheeled frame, said frame having three ground supporting elements and including a centrally located, vertically extending hollow beam with beam means extending from adjacent said supporting elements upwardly to said vertical beam, a bearing sleeve mounted for rotation and supported on the upper end of said vertical beam with an upright stem extending through said bearing into said beam, said bearing member comprising a sleeve to one side of which, a seat support is connected and turnable therewith about a vertical axis, said stem extending above the sleeve to afford a support for a surveyor instrument, an instrument guide connected to said bearing to extend upwardly substantially parallel to said stem, said guide being vertically adjustable with locking means to secure same in selected position.

2. The tripod of claim 1 wherein each of said supporting elements is comprised of a flat ground engaging plate with anchoring means for affixing same to the ground during operative use.

3. The tripod of claim 2 wherein a forward plate has hitch means for connection to a prime mover.

4. The tripod of claim 3 wherein there are two rear wheels with axles and the two rearmost plates are each linked to its respective axle, whereby said wheels can be pivoted forwardly out of contact with the ground, and moved rearwardly to place the tripod in travel position.

5. The tripod of claim 4 wherein each of said rearmost plates is linked to its respective axle through a hinge strap and a stop is secured to each plate, against, which its respective strap rests during transport.

6. The tripod of claim 1 wherein each of said supporting elements is a plate that rests on the ground and said beam means includes three inclined beams, each of said beams being fixed to its respective plate and extending upwardly to a connection point with said vertical beam below said bearing.

7. The tripod of claim 6 wherein reinforcing horizontal struts connect the base of said vertical beam to said plates.

8. The tripod of claim 1 wherein said stem is slideable within said vertical beam and locking means are provided to lock the stem in selected positions.

9. The tripod of claim 1, wherein a counter weight bracket is attached to said bearing member on the side opposite said seat support.

References Cited

UNITED STATES PATENTS

| | | | |
|---|---|---|---|
| 660,868 | 10/1900 | Reid | 248—162 X |
| 2,283,422 | 5/1942 | Chamberlain, Jr. | 248—186 |
| 2,386,266 | 10/1945 | Robertson | 248—178 X |
| 2,719,471 | 10/1955 | Aspden et al. | 248—178 X |
| 3,570,130 | 3/1971 | Boehm | 248—187 X |

GERALD M. FORLENZA, Primary Examiner

F. E. WERNER, Assistant Examiner

U.S. Cl. X.R.

33—69; 248—186, 415; 297—188, 349